United States Patent
Mishra et al.

(10) Patent No.: US 7,094,048 B2
(45) Date of Patent: Aug. 22, 2006

(54) FLEXIBLE IMAGING MEMBER BELT SEAM SMOOTHING METHOD

(75) Inventors: Satchidanand Mishra, Webster, NY (US); Robert C. U. Yu, Webster, NY (US); Anthony M. Horgan, Pittsford, NY (US); Bing R. Hsieh, Webster, NY (US); Donald C. VonHoene, Fairport, NY (US); Edward F. Grabowski, Webster, NY (US); Richard L. Post, Penfield, NY (US); Edward A. Domm, Hilton, NY (US)

(73) Assignee: Xerox Corporation, Stamford, CT (US)

( * ) Notice: Subject to any disclaimer, the term of this patent is extended or adjusted under 35 U.S.C. 154(b) by 75 days.

(21) Appl. No.: 09/892,009

(22) Filed: Jun. 26, 2001

(65) Prior Publication Data

US 2002/0008332 A1    Jan. 24, 2002

Related U.S. Application Data (62) Division of application No. 09/429,148, filed on Oct. 28, 1999, now Pat. No. 6,328,922.

(51) Int. Cl.
*B29C 65/02* (2006.01)
*B29C 65/12* (2006.01)
*B29C 65/18* (2006.01)

(52) U.S. Cl. ............ 425/407; 425/505; 425/508; 425/520; 425/DIG. 55; 156/137; 156/272.2; 264/345

(58) Field of Classification Search ........ 425/500–521, 425/407, DIG. 55; 428/57; 264/322, 345; 156/137, 304.6, 308.4, 346–348, 66, 272.2, 156/272.8, 275.1
See application file for complete search history.

(56) References Cited

U.S. PATENT DOCUMENTS

| | | | | |
|---|---|---|---|---|
| 2,804,419 A | * | 8/1957 | De Woskin et al. | 156/305 |
| 3,551,259 A | * | 12/1970 | Schwarzkopf | 156/581 |
| 3,596,043 A | * | 7/1971 | Sporri | 219/83 |
| 3,956,045 A | * | 5/1976 | Hoffman | 156/510 |
| 4,214,933 A | * | 7/1980 | Off et al. | 156/238 |
| 4,461,662 A | * | 7/1984 | Onishi | 264/445 |
| 4,528,056 A | * | 7/1985 | Hunt et al. | 156/253 |
| 4,532,166 A | * | 7/1985 | Thomsen et al. | 428/57 |
| 4,652,715 A | * | 3/1987 | Kitamura et al. | 219/64 |
| 4,746,391 A | * | 5/1988 | Heyse et al. | 156/359 |
| 5,087,495 A | * | 2/1992 | Nelson | 428/46 |

(Continued)

FOREIGN PATENT DOCUMENTS

JP    03-201367    *    9/1991

*Primary Examiner*—Yogendra N. Gupta
*Assistant Examiner*—Thu Khanh T. Nguyen
(74) *Attorney, Agent, or Firm*—Eugene O. Palazzo; Fay, Sharpe, Fagan, Minnich & McKee, LLP (57) ABSTRACT

Apparatus comprising a support member having a flat surface adapted to receive and support a seam region of a flexible belt comprising thermoplastic polymer material having a predetermined glass transition temperature, a heatable member having a smooth heatable flat surface for compressing at least a portion of the seam region of a flexible belt placed on the smooth flat surface of the support member to heat the portion to at least the glass transition temperature of the thermoplastic polymer material, the smooth surface of the heatable member having a profile which is parallel to the smooth flat surface of the support member, and wherein the heatable flat surface comprises a low surface energy or abhesive material.

9 Claims, 6 Drawing Sheets

U.S. PATENT DOCUMENTS 5,552,005 A * 9/1996 Mammino et al. .......... 156/157

6,368,440 B1 * 4/2002 Yu et al. .................. 156/304.6

* cited by examiner

\# FLEXIBLE IMAGING MEMBER BELT SEAM SMOOTHING METHOD

This application is a divisional application of U.S. application Ser. No. 09/429,148 filed Oct. 28, 1999, now U.S. Pat. No. 6,328,922.

BACKGROUND OF THE INVENTION

This invention relates in general to a seam surface treatment system and, more specifically, to a post ultrasonically welded seam treatment system for flexible imaging member belts.

Flexible electrostatographic belt imaging members are well known in the art. Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems. These belts are usually formed by cutting a rectangular sheet from a web containing at least one layer of thermoplastic polymeric material, overlapping opposite ends of the sheet, and joining the overlapped ends together to form a welded seam. The seam extends from one edge of the belt to the opposite edge. Generally, these belts comprise at least a supporting substrate layer and at least one imaging layer comprising thermoplastic polymeric matrix material. The "imaging layer" as employed herein is defined as the dielectric imaging layer of an electroreceptor belt, the transfer layer of an intermediate transfer belt and, the charge transport layer of an electrophotographic belt. Thus, the thermoplastic polymeric matrix material in the imaging layer is located in the upper portion of a cross section of an electrostatographic imaging member belt, the substrate layer being in the lower portion of the cross section of the electrostatographic imaging member belt. Although the flexible belts of interest include the mentioned types, for simplicity reasons, the discussion hereinafter will be focus on the electrophotographic imaging member belts.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A typical layered photoreceptor having separate charge generating (photogenerating) and charge transport layers is described in U.S. Pat. No. 4,265,990, the entire disclosure thereof being incorporated herein by reference. The charge generating layer is capable of photogenerating holes and injecting the photogenerated holes into the charge transport layer.

Although excellent toner images may be obtained with multilayered belt photoreceptors, it has been found that as more advanced, higher speed electrophotographic copiers, duplicators and printers were developed, fatigue induced cracking of the charge transport layer at the welded seam area is frequently encountered during photoreceptor belt cycling. Moreover, the onset of seam cracking has also been found to rapidly lead to seam delamination due to fatigue thereby shortening belt service life. Dynamic fatigue seam cracking and may possibly happen in ionographic imaging member belts as well.

The flexible electrostatographic imaging member belts are fabricated from a sheet cut from an imaging member web. The sheets are generally rectangular in shape. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. Ultrasonic welding is generally the preferred method of joining because is rapid, clean (no solvents) and produces a thin and narrow seam. In addition, ultrasonic welding is preferred because the mechanical pounding of the welding horn causes generation of heat at the contiguous overlapping end marginal regions of the sheet to maximize melting of one or more layers therein. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

When ultrasonically welded into a belt, the seam of multilayered electrophotographic imaging flexible member belts may occasionally contain undesirable high protrusions such as peaks, ridges, spikes, and mounds. These seam protrusions present problems during image cycling of the belt machine because they interact with cleaning blades to cause blade wear and tear which ultimately affect cleaning blade efficiency and service life. Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member. Another frequently observed mechanical failure in the imaging belts during image cycling is that the ultrasonically welded seam of an electrophotographic imaging member belt can also cause initiation of cracks in the seam which then propagate and lead to delamination after being subjected to extended bending and flexing cycles over small diameter belt support rollers of an imaging machine or when due to lateral forces caused by mechanical rubbing contact against stationary web edge guides of a belt support module during cycling. Seam cracking and delamination has also been found to be further aggravated when the belt is employed in electrophotographic imaging systems utilizing blade cleaning devices and some operational imaging subsystems. Alteration of materials in the various photoreceptor belt layers such as the conductive layer, hole blocking layer, adhesive layer, charge generating layer, and/or charge transport layer to suppress cracking and delamination problems is not easily accomplished. The alteration of the materials may adversely impact the overall physical, electrical, mechanical, and other properties of the belt such as well as coating layer uniformity, residual voltage, background, dark decay, flexibility, and the like.

For example, when a flexible imaging member belt used in an electrophotographic machine is a photoreceptor belt fabricated by ultrasonic welding of overlapped opposite ends of a sheet, the ultrasonic energy transmitted to the overlapped ends melts the thermoplastic sheet components in the overlap region to form a seam. The ultrasonic welded seam of a multilayered photoreceptor belt is relatively brittle and low in strength and toughness. The joining techniques, particularly the welding process, can result in the formation of a splashing that projects out from either side of the seam in the overlap region of the belt. The overlap region and spashings on each side of the overlap region comprise a strip from one edge of the belt to the other that is referred herein as the "seam region". Because of the splashing, a typical flexible imaging member belt is about 1.6 times thicker in the seam region than that of the remainder of the belt (e.g., in a typical example, 188 micrometers versus 116 micrometers).

The photoreceptor belt in an electrophotographic imaging apparatus undergoes bending strain as the belt is cycled over a plurality of support and drive rollers. The excessive thickness of the photoreceptor belt in the seam region due to the presence of the splashing results in a large induced bending strain as the seam travels over each roller. Generally, small diameter support rollers are highly desirable for simple, reliable copy paper stripping systems in electrophotographic imaging apparatus utilizing a photoreceptor belt system operating in a very confined space. Unfortunately, small diameter rollers, e.g., less than about 0.75 inch (19 millimeters) in diameter, raise the threshold of mechanical performance criteria to such a high level that photoreceptor belt seam failure can become unacceptable for multilayered belt photoreceptors. For example, when bending over a 19 millimeter diameter roller, a typical photoreceptor belt seam splashing may develop a 0.96 percent tensile strain due to bending. This is 1.63 times greater than a 0.59 percent induced bending strain that develops within the rest of the photoreceptor belt. Therefore, the 0.96 percent tensile strain in the seam splashing region of the belt represents a 63 percent increase in stress placed upon the seam splashing region of the belt.

Under dynamic fatiguing conditions, the seam provides a focal point for stress concentration and becomes the point of crack initiation which is further developed into seam delamination causing premature mechanical failure in the belt. Thus, the splashing tends to shorten the mechanical life of the seam and service life of the flexible member belts used in copiers, duplicators, and printers.

Although a solution to suppress the seam cracking/delamination problems has been successfully demonstrated, as described in a prior art, by a specific heat treatment process of a flexible electrophotographic imaging member belt with its seam parked directly on top of a 19 mm diameter back support rod for stress-releasing treatment at a temperature slightly above the glass transition temperature (Tg) of the charge transport layer of the imaging member, nevertheless this seam stress release process was also found to produce various undesirable effects such as causing seam area imaging member set and development of belt ripples in the active electrophotographic imaging zones of the belt (e.g., the region beyond about 25.2 millimeters from either side from the midpoint of the seam). Moreover, the heat treatment can induce undesirable circumferential shrinkage of the imaging belt. The set in the seam area of an imaging member mechanically adversely interacts with the cleaning blade and impacts cleaning efficiency. The ripples in the imaging member belt manifest themselves as copy printout defects. Further, the heat induced imaging belt dimensional shrinkage alters the precise dimensional specifications required for the belt. Another key shortcoming associated with the prior art seam stress release heat treatment process is the extensive heat exposure of a large seam area. This extensive heat exposure heats both the seam area of the belt as well as the rod supporting the seam. Since the belt must be cooled to below the glass transition temperature of the thermoplastic material in the belt prior to removal from the support rod in order to produce the desired degree of seam stress release in each belt, the heat treatment and cooling cycle time is unduly long and leads to very high belt production costs.

Since there is no effective way to prevent the generation of localized high protrusions at the seam, imaging member belts are inspected, right after seam welding belt production process, manually by hand wearing a cotton glove through passing the index finger over the entire seam length and belts found catching the glove by the protrusions are identified as production rejects. Both the time consuming procedure of manual inspection and the number of seamed belts rejected due to the presence of high seam protrusions constitute a substantial financial burden on the production cost of imaging member belts.

Therefore, there is an urgent need to provide seamed flexible imaging belts with an improved seam morphology which can withstand greater dynamic fatigue conditions thereby extending belt service life. It is also important, from the imaging member belt production point of view, that effective cutting of unit manufacturing cost of seamed imaging belts can be realized if an innovative post seaming treatment process can be developed to provide the triple improvements of seam region thickness reduction, morphological seam surface smoothing, and elimination of seam protrusions to achieve smooth seams.

INFORMATION DISCLOSURE STATEMENT

U.S. Pat. No. 5,552,005 to Mammino et al., issued Sep. 3, 1996—A flexible imaging sheet and a method of constructing a flexible imaging sheet is disclosed. The method of constructing a flexible imaging sheet comprises a step of overlapping, a step of joining, and a step of shaping. In the step of overlapping, a first marginal end region and a second marginal end region of a sheet are overlapped to form an overlap region and a non-overlap region. In the step of joining, the first marginal end region and the second marginal end region of the sheet are joined to one another by a seam in the overlap region. In the step of shaping, the overlap region is shaped to form a generally planar surface co-planar with a surface of the non-overlap region. The flexible imaging sheet comprises a first marginal end region and a second marginal end region. The first marginal end region and the second marginal end region are secured by a seam to one another in the overlap region. The first marginal end region and the second marginal end region are substantially co-planar to minimize stress on the flexible imaging sheet. Minimization of stress concentration, resulting from dynamic bending of the flexible imaging sheet during cycling over a roller within an electrophotographic imaging apparatus, is particularly accomplished in the present invention.

U.S. Pat. No. 5,240,532, issued to Yu on Aug. 31, 1993—A process for treating a flexible electrostatographic imaging web is disclosed including providing a flexible base layer and a layer including a thermoplastic polymer matrix comprising forming at least a segment of the web into an arc having a radius of curvature between about 10 millimeters and about 25 millimeters measured along the inwardly facing exposed surface of the base layer, the arc having an imaginary axis which traversed the width of the web, heating at least the polymer matrix in the segment to at least the glass transition temperature of the polymer matrix, and cooling the imaging member to a temperature below the glass transition temperature of the polymer matrix while maintaining the segment of the web in the shape of the arc.

U.S. Pat. No. 5,376,491 to Krumberg et al., issued Dec. 27, 1994—An organic photoconductor is disclosed including a base layer formed of a first material and a photoconductive layer formed of a second material. The organic photoconductor being characterized in that when it is maintained in a curved orientation with the photoconductive layer facing outward, the photoconductive layer is subjected to less stress than the base layer. In one embodiment the first material is relatively more flexible and stretchable than said second material and the materials are pre-stressed in opposite senses. In a second embodiment the first material is relatively flexible and stretchable and the second material is an initially less flexible and stretchable material which has been chemically treated to increase its stretchability and flexibility.

U.S. Pat. No. 5,021,109 to Petropoulous et al., issued Jun. 4, 1991—A process is disclosed for preparing a multilayered belt comprising the steps of: (1) heating a substrate in a form of a tubular sleeve and formed of a polymeric material to at least about a glass transition temperature of the polymeric material, so as to expand the tubular sleeve; (2) placing the expanded tubular sleeve on a mandrel; (3) treating the tubular sleeve by applying one or more multilayered composite belts; (4) layers on the sleeve to form a heating composite belt to at least about the glass transition temperature of the polymeric material of the tubular sleeve; and (5) cooling the composite belt.

U.S. Pat. No. 5,603,790 to Rhodes, issued Feb. 18, 1997—Process and apparatus for fabricating belts are disclosed. The process includes conveying the leading edge of a flexible web from a supply roll past a slitting station, slitting the web a predetermined distance from the leading edge to form a web segment having the leading edge at one end and a trailing edge at the opposite end, maintaining the web slack at the location where the web is slit during slitting, overlapping the leading edge and the trailing edge of the web segment to form a joint and welding the joint to permanently join the leading edge and the trailing edge together to form a belt. The apparatus includes means to convey the leading edge of a flexible web from a supply roll past a slitting station, means at the slitting station to slit the web a predetermined distance from the leading edge to form a web segment having the leading edge at one end and a trailing edge at the opposite end, means to maintain the web slack at the location where the web is slit during slitting, means to overlap the leading edge and the trailing edge of the web segment to form a joint and means to weld the joint to permanently join the leading edge and the trailing edge together to form a belt.

U.S. Pat. No. 4,840,873 to Kobayashi et al., issued Jun. 20, 1989—A process is disclosed for producing an optical recording medium comprising the step of heat treating an optical recording medium comprising a plastic substrate having a surface of minutely roughened structure and a thin metal film formed on the surface. The optical recording medium is heated at a temperature within a range which is lower by 80° C. and higher by 60° C. than the glass transition temperature of the plastic substrate.

U.S. Pat. No. 4,532,166 to Thomsen et al., issued Jul. 30, 1985—A welded web is disclosed which is prepared by overlapping a first edge over a second edge, then applying heat necessary to bond the first edge with the second edge. The heating techniques may include ultrasonic welding, radio frequency heating, and the like.

U.S. Pat. No. 3,988,399 to Evans, issued Oct. 26, 1996—Heat recoverable articles are disclosed which have an elongate S-shaped configuration, which later can be wrapped about a substrate. The articles comprise a molecularly oriented unitary polymeric layer which has been differentially annealed while restrained against dimensional change and crosslinking.

CROSS REFERENCE TO RELATED APPLICATIONS

This application is related to the following U.S. patent applications:

U.S. patent application Ser. No. 09/428,932, now U.S. Pat. No. 6,652,691, filed concurrently herewith, in the names of Yu et al., entitled "SEAM STRESS RELEASE AND PROTRUSIONS ELIMINATION PROCESS", —A process is disclosed including providing a support having an elongated surface with an arcuate convex substantially semicircular cross section having a predetermined radius of curvature, providing a flexible belt having parallel edges and a welded seam extending from one edge to the other edge, the belt seam comprising a seam region including splashings, thermoplastic polymer material having a glass transition temperature, an inner surface and an outer surface, supporting the inner surface of the seam on the elongated surface with the belt conforming to the predetermined radius of curvature, progressively elevating the temperature of localized sites along the seam from one edge of the belt to the other with heat energy to at least the glass transition temperature of the thermoplastic polymer material, applying line compression pressure against the seam region by pressing a rotatable wheel having a peripheral surface with an arcuate concave cross section having a radius of curvature which matches or is slightly larger than the predetermined curvature of the arcuate convex substantially semicircular cross section of the elongated surface, simultaneously rolling and pressing a part of the peripheral surface of the wheel against the outer surface of the seam from one edge of the belt to the other while the temperature of the localized sites pressed by the wheel is at at least the glass transition temperature of the thermoplastic polymer material, the part of the surface of the wheel pressing against the outer surface of the seam being substantially parallel to the predetermined curvature of the elongated surface and in substantially line contact with the outer surface of the seam, and rapidly cooling the seam to a temperature below the glass transition temperature of the thermoplastic material while maintaining the belt in conformance with the predetermined arc. Apparatus for achieving stress relaxation and eliminating protrusions in the seam region is also disclosed. The entire disclosure of this application is incorporated herein by reference.

U.S. patent application Ser. No. 09/004,651, filed on Jan. 8, 1998, in the name of Yu et al., now U.S. Pat. No. 6,074,504, entitled "DEFOCUSED LASER SEAM STRESS RELEASE IN FLEXIBLE ELECTROSTATOGRAPHIC IMAGING MEMBER BELTS", —A process is disclosed for treating a seamed flexible electrostatographic imaging belt including providing an imaging belt having two parallel edges, the belt comprising at least one layer comprising a thermoplastic polymer matrix and a seam extending from one edge of the belt to the other, the seam having an imaginary centerline, providing an elongated support member having at arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member, precisely traversing the length of the seam from one edge of the belt to the other with thermal energy radiation having a narrow Gaussian wavelength distribution of between about 10.4 micrometers and about 11.2 micrometers emitted from a carbon dioxide laser, the thermal energy radiation forming a spot straddling the seam during traverse, the spot having a width of between about 3 millimeters and about 25 millimeters measured in a direction perpendicular to the imaginary centerline of the seam, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member. The entire disclosure of this application is incorporated herein by reference.

U.S. patent application Ser. No. 09/004,290, filed on Jan. 8, 1998, in the name of Grabowski et al., now U.S. Pat. No. 6,056,839 entitled "RAPID ELECTROSTATOGRAPHIC BELT TREATMENT SYSTEM", —A process is disclosed for treating a seamed flexible electrostatographic imaging belt is disclosed including providing an imaging belt including at least one imaging layer including a thermoplastic polymer matrix and a seam extending from one edge of the belt to the other, the seam having a region on the belt adjacent each side of the seam and also having an exposed surface on each side of the belt, supporting the belt with at least one vacuum holding device spaced from the seam while maintaining the seam and region of the belt adjacent each side of the seam in an arcuate shape having at least a substantially semicircular cross section having a radius of curvature of between about 9.5 millimeters and about 50 millimeters, heating the thermoplastic polymer matrix of the imaging layer in the seam and the region of the belt adjacent each side of the seam to at least the glass transition temperature (Tg) of the thermoplastic polymer matrix without significantly heating the support member, and contacting the exposed surface of the seam and regions on each side of the belt with a gas to rapidly cool the seam and regions on each side of the belt to a temperature below the glass transition temperature of the polymer matrix while maintaining the arcuate shape of the region of the belt adjacent each side of the seam. Apparatus for carrying out this process is also disclosed. The entire disclosure of this application is incorporated herein by reference.

Thus, there is a continuing need for electrostatographic imaging belts having improved resistance to seam cracking and delamination, free of seam protrusions, and free of factors that damage imaging subsystems.

SUMMARY OF THE INVENTION

It is, therefore, an object of the present invention to provide an improved electrostatographic imaging member belt which overcomes the above-noted deficiencies.

It is yet another object of the present invention to provide a mechanically robust seamed electrostatographic imaging member belt.

It is still another object of the present invention to provide an improved electrostatographic imaging member belt having an ultrasonically welded seam which exhibits greater resistance to dynamic fatigue induced seam cracking and delamination.

It is another object of the present invention to provide an improved electrostatographic imaging member belt having a welded seam which exhibits greater resistance to cracking and delamination and no seam area imaging member set.

It is yet another object of the present invention to provide an improved electrostatographic imaging member belt having a mechanically robust welded seam and exhibiting good circumferential dimension tolerance.

It is also another object of the present invention to provide an improved electrostatographic imaging member belt having a welded seam which is free of fatigue induced belt ripples to create copy printout defects.

It is still another object of the present invention to provide a process that yields improved electrostatographic imaging member belts having a welded seam which is free of seam protrusions and having a smoother surface morphological profile.

It is still yet another object of the present invention to provide an improved electrostatographic imaging member belt with a reduced seam area thickness to minimize the seam region induce bending stress when the electrostatographic imaging member belt flexes over small diameter belt module support rollers.

The foregoing objects and others are accomplished in accordance with this invention by providing a process for post treatment of an ultrasonically welded seamed flexible imaging member belt including providing an elongated support member having a smooth flat supporting surface of a support member, providing a flexible belt having parallel edges and a welded seam extending from one edge to the other edge, the belt seam including a seam region including an overlap and two adjacent splashings, thermoplastic polymer material having a glass transition temperature and an inner and outer surface, supporting the inner surface of seam on the smooth flat supporting surface with the seam region of the belt held down by vacuum against and conforming to the flat supporting surface of the support member, contacting the seam with a heated surface, the contacting heated surface comprises a smooth low surface energy or abhesive material and has profile that is substantially parallel to the smooth flat supporting surface of the support member, heating the seam with the heated surface to raise the temperature in the seam region to a temperature of from about 2° C. to 20° C. above the Tg of the thermoplastic polymer material, and compressing the seam with the heated surface with sufficient compression pressure to smooth out, eliminate protrusion spots, and reduce seam region thickness.

This invention also includes apparatus to smooth out the seam, eliminate protrusions, and effect thickness reduction in the seam region.

Although this invention relates to apparatus and process improvements for seamed flexible electrostatographic imaging member belts, the following will focus only on seamed flexible electrophotographic imaging member belts to simplify discussion.

A more complete understanding of the process and apparatus of the present invention can be obtained by reference to the accompanying drawings wherein:

BRIEF DESCRIPTION OF THE DRAWINGS

In the detailed description of the preferred embodiment of the present invention, reference is made to the accompanying drawings, in which.

In the drawings and the following description, it is to be understood that like numeric designations refer to components of like function.

DETAILED DESCRIPTION OF THE PREFERRED EMBODIMENTS

Although specific terms are used in the following description for the sake of clarity, these terms are intended to refer only to the particular structure of the invention selected for illustration in the drawings, and are not intended to define or limit the scope of the invention.

Figure 1:
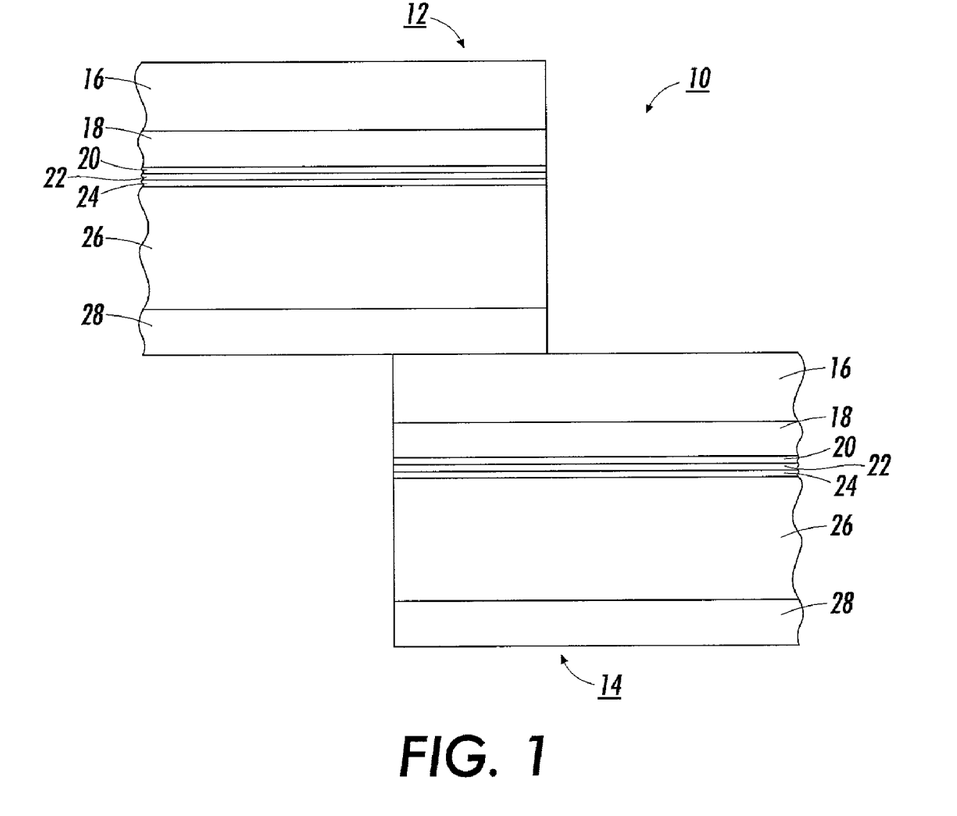
FIG. 1 illustrates a schematic partial cross-sectional view of a multiple layered flexible sheet of electrophotographic imaging member material with opposite ends overlapped.

Referring to FIG. 1, there is illustrated a flexible electrophotographic imaging member 10 in the form of a sheet having a first end marginal region 12 overlapping a second end marginal region 14 to form an overlap region ready for a seam forming operation. The flexible electrophotographic member 10 can be utilized within an electrophotographic imaging device and may be a single film substrate member or a member having a film substrate layer combined with one or more additional coating layers. At least one of the coating layers comprises a film forming binder.

The flexible electrophotographic imaging member 10 may be a single layer or comprise multiple layers. If the flexible electrophotographic imaging member 10 is to be a negatively charged photoreceptor device, the flexible electrophotographic imaging member 10 may comprise a charge generator layer sandwiched between a conductive surface and a charge transport layer. Alternatively, if the flexible imaging member 10 is to be a positively charged photoreceptor device, the flexible imaging member 10 may comprise a charge transport layer sandwiched between a conductive surface and a charge generator layer.

The layers of the flexible electrophotographic imaging member 10 can comprise numerous suitable materials having suitable mechanical properties. Examples of typical layers are described in U.S. Pat. Nos. 4,786,570, 4,937,117 and 5,021,309, the entire disclosures thereof being incorporated herein by reference. The belt of flexible electrophotographic imaging member 10 shown in FIG. 1, including the two end marginal regions 12 and 14, comprises from top to bottom a charge transport layer 16, a generator layer 1, an interface layer 20, a blocking layer 22, a conductive ground plane layer 24, a supporting layer 26, and an anti-curl back coating layer 28. It should be understood that the thickness of the layers are conventional and that a wide range of thicknesses can be used for each of the layers.

Figure 2:
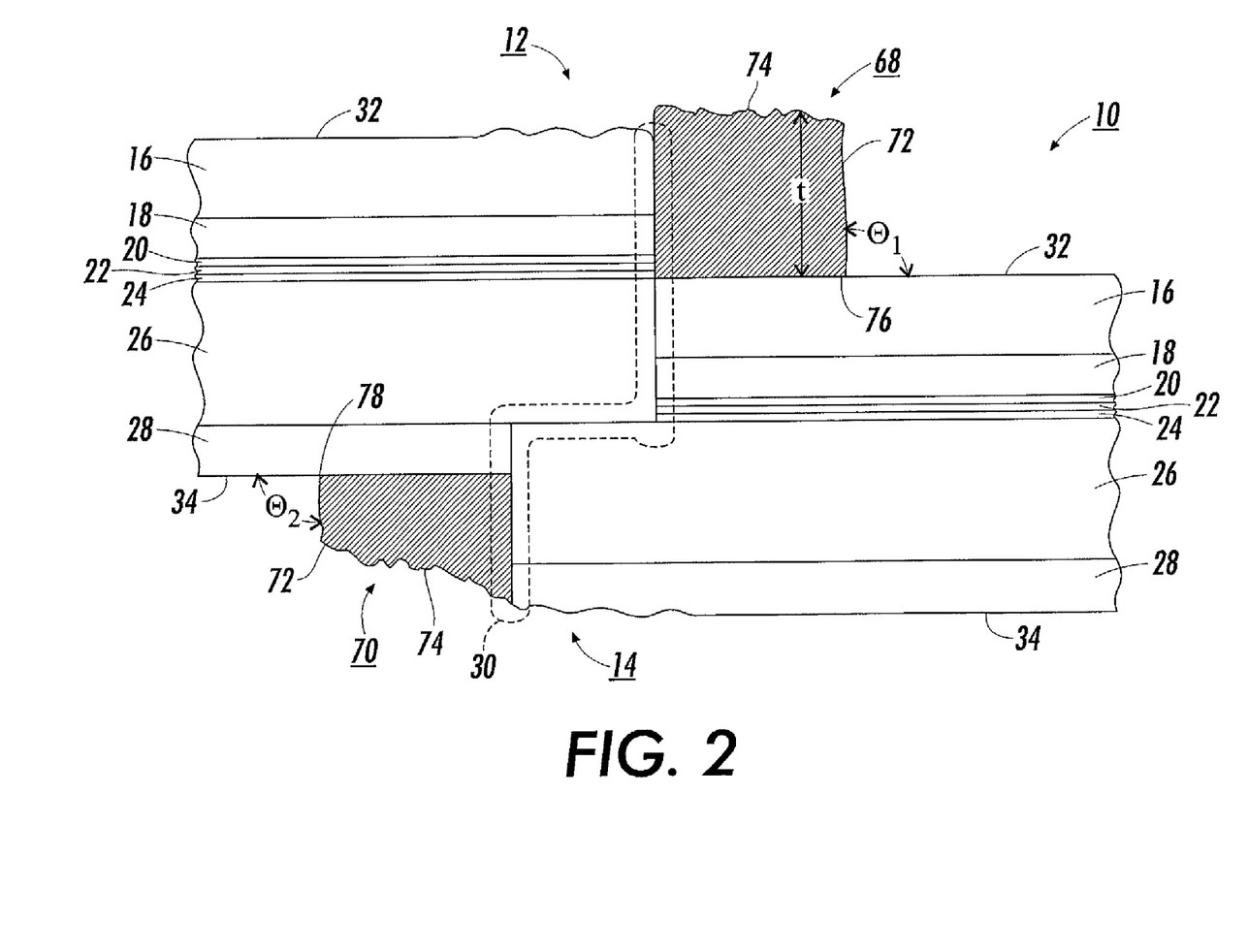
FIG. 2 shows a schematic partial cross-sectional view of a multiple layered seamed flexible electrophotographic imaging member belt derived from the sheet illustrated in FIG. 1 after ultrasonic seam welding.

The end marginal regions 12 and 14 can be joined by any suitable means including gluing, taping, stapling, pressure and heat fusing to form a continuous member such as a belt, sleeve, or cylinder, nevertheless, from the viewpoint of considerations such as ease of belt fabrication, short operation cycle time, and the mechanical strength of the fabricated joint, the ultrasonic welding process is preferably used to join the end marginal regions 12 and 14 of flexible electrophotographic imaging member sheet 10 into a seam 30 in the overlap region, as shown in FIG. 2, to form a seamed flexible electrophotographic imaging member belt 10. As illustrated in FIG. 2, the location of seam 30 is indicated by a dotted line. Seam 30 comprises two vertical portions joined by a horizontal portion. Thus, the midpoint of seam 30 may be represented by an imaginary centerline extending the length of seam 30 from one edge of belt 10 to the opposite edge, the imaginary centerline (not shown) running along the middle of the horizontal portion which joins the two vertical portions illustrated in FIG. 2. In other words, a plan view (not shown) of the horizontal portion of seam 30 would show a strip much like a two lane highway in which the centerline would be represented by the white divider line separating the two lanes, the two lanes comprising end marginal regions 12 and 14. The flexible electrophotographic imaging member 10 is thus transformed from a sheet of electrophotographic imaging member material as illustrated in FIG. 1 into a continuous electrophotographic imaging member belt as illustrated in FIG. 2. The flexible electrophotographic imaging member 10 has a first major exterior surface or side 32 and a second major exterior surface or side 34 on the opposite side. The seam 30 joins the flexible electrophotographic imaging member 10 so that the bottom surface 34 (generally including at least one layer immediately above) at and/or near the first end marginal region 12 is integral with the top surface 32 (generally including at east one layer immediately below) at and/or near the second end marginal region 14.

A preferred heat/pressure joining means includes ultrasonic welding to transform the sheet of photoconductive imaging material into a photoreceptor belt. The belt can be fabricated by ultrasonic welding of the overlapped opposite end regions of a sheet. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Figure 3:
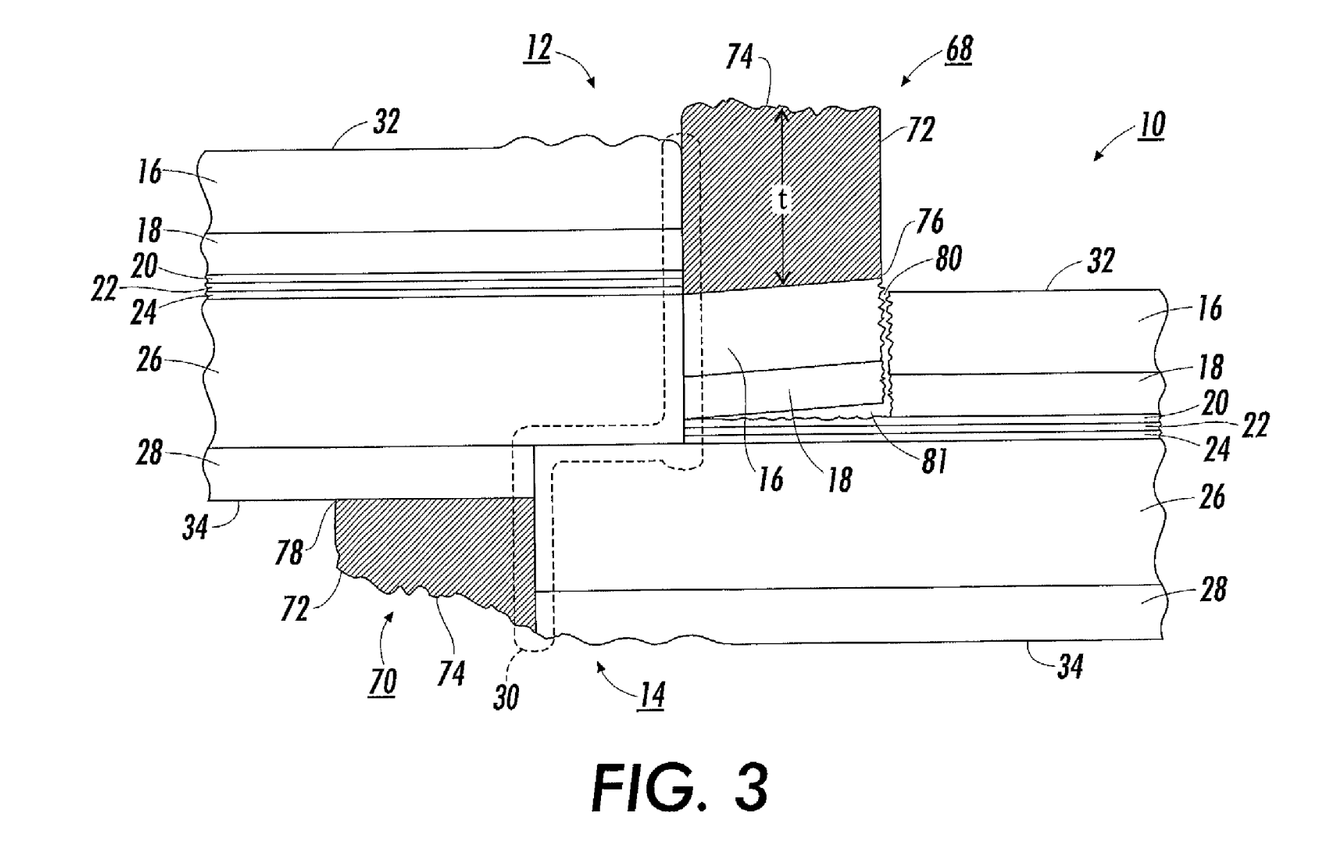
FIG. 3 illustrates a schematic partial cross-sectional view of a multiple layered seamed flexible electrophotographic imaging member belt which has mechanical failure due to fatigue induced seam cracking and delamination.
Figure 4:
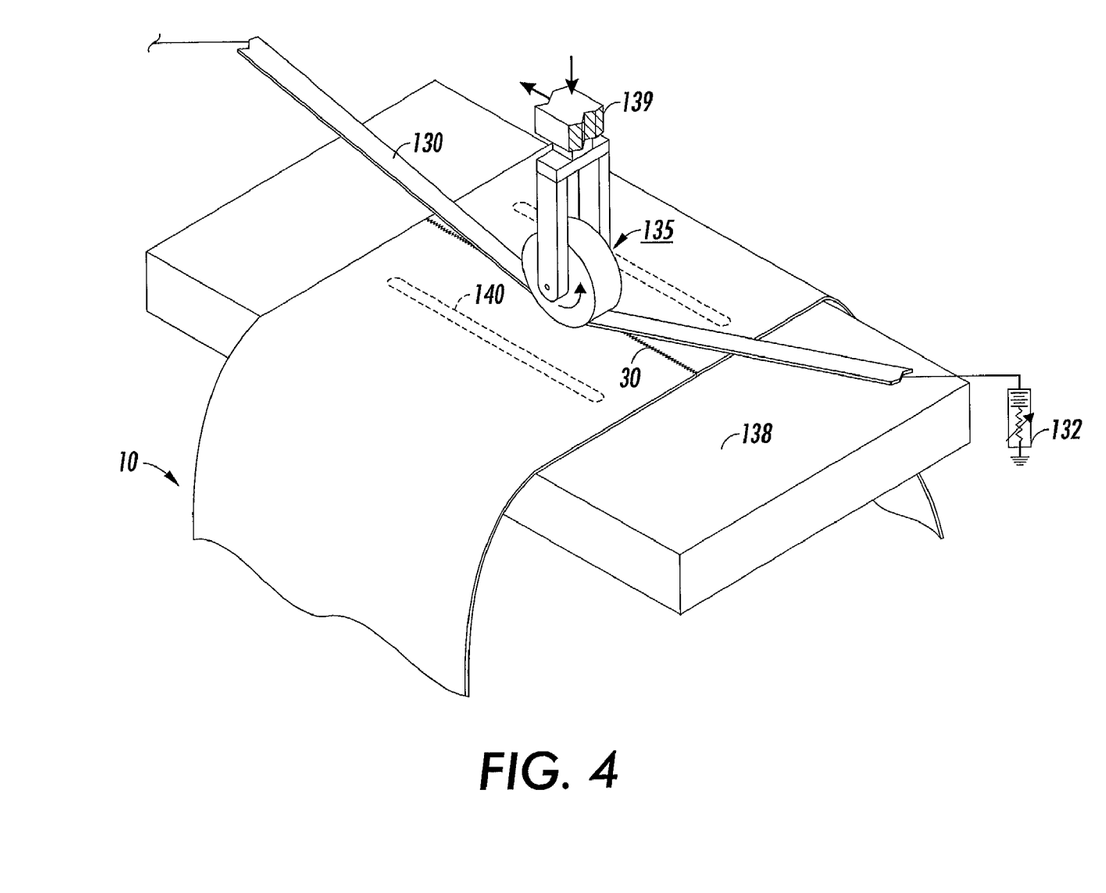
FIG. 4 shows an isometric schematic view of a seamed flexible electrophotographic imaging member belt in which the seam is positioned onto and held down over the flat supporting surface of an elongated support member while subjected to seam smoothing and protrusion elimination process at an elevated temperature utilizing a strip heat source that covers the entire seam length and a flat surface rotatable compression wheel.

Upon completion of welding the overlap region of the flexible electrophotographic imaging member sheet into a seam 30 using ultrasonic seam welding technique, the overlap region is transformed into an overlapping and abutting region as illustrated in FIGS. 2 and 3. Within the overlapping and abutting region, the portions of the flexible electrophotographic imaging member 10, which once formed the end marginal regions 12 and 14, are joined by the seam 30 such that the once end marginal regions 12 and 14 are overlapping and abutting one another. The welded seam 30 contains upper and lower splashings 68 and 70 at each end thereof as illustrated in FIGS. 2 and 4. The splashings 68 and 70 are formed in the process of joining the end marginal regions 12 and 14 together. Molten material is necessarily ejected from either side of the overlap region to facilitate direct support layer 26 to support layer fusing and results in the formation of the splashings 68 and 70. The upper splashing 68 is formed and positioned above the overlapping end marginal region 14 abutting the top surface 32 and adjacent to and abutting the overlapping end marginal region 12. The lower splashing 70 is formed and positioned below the overlapping end marginal region 12 abutting bottom surface 34 and adjacent to and abutting the overlapping end marginal region 14. The splashings 68 and 70 extend beyond the sides and the edges of the seam 30 in the overlap region of the welded flexible electrophotographic imaging member 10. The extension of the splashings 68 and 70 beyond the sides and the edges of the seam 30 is undesirable for many machines such as electrophotographic copiers, duplicators and copiers that require precise edge positioning of a flexible electrophotographic imaging member 10 during machine operation. Generally, the extension of the splashings 68 and 70 at the belt edges of the flexible electrophotographic imaging member 10 are removed by a notching operation.

A typical upper splashing 68 has a height or thickness t of about 90 micrometers and projects about 17 microns above the surface of the overlapping end marginal region 12. Each of the splashings 68 and 70 has an uneven but generally rectangular shape including one side (free side) 72 (which forms a free end) extending inwardly toward top surface 32 from an outwardly facing side 74 (extending generally parallel to either the top surface 32 or the bottom surface 34). The free side 72 of the splashing 68 forms an approximately perpendicular angle $\theta_1$ with the bottom surface 34 of the flexible electrophotographic imaging member 10. Likewise, the free side 72 of the splashing 70 forms an approximately perpendicular angle $\theta_2$ at the junction 78 of the free side 72 of the lower splashing 70 and the bottom surface 34 of the flexible imaging member belt 10. Likewise, a meeting or junction point 78 exists at the junction of the free side 72 of the lower splashing 70 and the bottom surface 34 of the flexible electrophotographic imaging member belt 10. Both junction points 76 and 78 provide focal points for the stress concentration and become the initial points of failure affecting the mechanical integrity of the flexible electrophotographic imaging member belt 10.

During machine operation, the seamed flexible electrophotographic imaging member belt 10 cycles or bends over rollers, particularly small diameter rollers, of a belt support module within an electrophotographic imaging apparatus. As a result of dynamic bending/flexing of the flexible electrophotographic imaging member belt 10 during cycling, the rollers repeatedly exert a force on the flexible imaging member belt 10 which causes large stresses to develop generally adjacent to the seam 30 due to the excessive thickness and material discontinuity thereof. The stress concentrations that are induced by bending near the junction points 76 and 78 may reach values much larger than the average value of the stress over the entire length of the flexible electrophotographic imaging member belt 10. The induced bending stress is inversely related to the diameters of a roller that the flexible imaging member 10 bends over and directly related to the thickness of the seam 30 of the flexible electrophotographic imaging member belt 10. When a structural member, such as the flexible electrophotographic imaging member belt 10, contains a sudden increase in cross-sectional thickness at the overlap region, high localized stress occurs near the discontinuity, e.g., junction points 76 and 78.

When the flexible electrophotographic imaging member belt 10 bends over the rollers of a belt module within an electrophotographic imaging apparatus, the bottom surface 34 of the flexible electrophotographic imaging member belt 10, which is adapted to contact the exterior surface of the roller, is compressed. In contrast, the top surface 32 is stretched under tension. This is attributable to the fact that the top surface 32 and bottom surface 34 move in a circular path about the circular roller. Since the top surface 32 is at greater radial distance from the center of the circular roller than the bottom surface 34, the top surface 32 must travel a greater distance than the bottom surface 34 in the same time period. Therefore, the top surface 32 must be stretched under tension relative to a generally central portion of the flexible electrophotographic imaging member belt 10 (the portion of the flexible electrophotographic imaging member belt 10 generally extending along the center of gravity of the flexible imaging member 10). Likewise, the bottom surface 34 must be compressed relative to the generally central portion of the flexible imaging member 10 (the portion of the flexible electrophotographic imaging member belt 10 generally extending along the center of gravity of the flexible electrophotographic imaging member belt 10). Consequently, the bending stress at the junction point 76 will be tension stress, and the bending stress at the junction point 78 will be compression stress.

Compression stresses, such as at the junction point 78, rarely cause seam 30 failure. Tension stresses, such as at junction point 76, however, are much more of a problem. The tension stress concentration at the junction point 76 in great likelihood will eventually result in crack initiation through the electrically active layers of the flexible electrophotographic imaging member belt 10 as illustrated in FIG. 3. The illustrated crack 80 is adjacent to the top splashing 68 of the second end marginal region 14 of the flexible electrophotographic imaging member belt 10. The generally vertically extending crack 80 initiated in the charge transport layer 16 continues to propagate through the generator layer 18. Inevitably, the crack 80 extends generally horizontally to develop seam delamination 81 which is propagated through the relatively weak adhesion bond between the adjoining surfaces of the generator layer 18 and the interface layer 20.

The formation of the local seam delamination 81 is typically referred to as seam puffing. The excess thickness of the splashing 68 and stress concentration at the junction 76 causes the flexible electrophotographic imaging member belt 10 to perform, during extended machine operation, as if a material defect existed therein. Thus, the splashing 68 tends to promote the development of dynamic fatigue seam 30 failure and can lead to separation of the joined end marginal regions 12 and 14 severing the flexible imaging member 10. Consequently, the service life of the flexible imaging member 10 is shortened.

In addition to seam failure, the crack 80 acts as a depository site and collects toner, paper fibers, dirt, debris and other unwanted materials during electrophotographic imaging and cleaning of the flexible electrophotographic imaging member belt 10. For example, during the cleaning process, a cleaning instrument, such as a cleaning blade, will repeatedly pass over the crack 80. As the site of the crack 80 becomes filled with debris, the cleaning instrument dislodges at least some portion of this highly concentrated level of debris from the crack 80. The amount of the debris, however, is beyond the removal capacity of the cleaning instrument. As a consequence, the cleaning instrument dislodges the highly concentrated level of debris but cannot remove the entire amount during the cleaning process. Instead, portions of the highly concentrated debris is deposited onto the surface of the flexible electrophotographic imaging member belt 10. In effect, the cleaning instrument spreads the debris across the surface of the flexible electrophotographic imaging member belt 10 instead of removing the debris therefrom.

In addition to seam failure and debris spreading, the portion of the flexible member 10 above the seam delamination 81, in effect, becomes a flap which moves upwardly. The upward movement of the flap presents an additional problem during the cleaning operation. The flap becomes an obstacle in the path of the cleaning instrument as the instrument travels across the surface of the flexible electrophotographic imaging member belt 10. The cleaning instrument eventually strikes the flap when the flap extends upwardly. As the cleaning instrument strikes the flap, great force is exerted on the cleaning instrument which can lead to damage thereof, e.g., excessive wear and tearing of the cleaning blade.

In addition to damaging the cleaning blade, the striking of the flap by the cleaning instrument causes unwanted vibration in the flexible electrophotographic imaging member belt 10. This unwanted vibration adversely affects the copy/print quality produced by the flexible electrophotographic imaging member belt 10. The copy/print is affected because imaging occurs on one part of the flexible imaging member 10 simultaneously with the cleaning of another part of the flexible imaging member 10.

An embodiment of the process and apparatus of the present invention, illustrated in FIG. 4, utilizes a flexible heating strip 130 in combination with a compression wheel assembly 135 to provide instant localized heating and compression of only a small area of seam 30 and yield seam area surface smoothing and high protrusions elimination results while the seam 30 of imaging member belt 10 is positioned and vacuum held down on the flat smooth supporting surface of support member 138. The heating strip 130 has a smooth outer surface on each major side. Moreover, the major side contacting the seam region (i.e., side of strip 130 facing belt 10) is coated with a thin abhesive or low surface energy coating to prevent imaging layer material from adhering to the surface of the strip when seam treatment is carried out. Any suitable abhesive or low surface energy material may be employed. Typical abhesive or low surface energy coating materials include, for example, Teflon, fluoro-hydrocarbon polymer, silicone, polyimide, and the like. A thin Teflon coating is preferred because it promotes ease of release and prevents imaging member material from sticking to the surface of the heating strip 130 when the heating strip contacts the seam 30. Heating strip 130 may comprise any suitable flexible material that can be electrically heated. Typical flexible materials include, for example, metal, plastic, and the like. If the heating strip comprises plastic material, the melting temperature thereof should substantially higher than the heating temperatures employed to ensure heating strip integrity. The entire heating strip 130 may comprise electrically resistive material or may be a composite device. A preferred heating strip 130 comprises a supporting member containing imbedded resistance wires. Resistance wires are well know and are used, for example, in heating mantles, electric blankets, heating pads, automobile window defrosters, and the like. Spacing of the resistance wires should be sufficiently close to ensure substantially uniform heating along the length of the heating strip 130. The efficiency of heat energy delivery from the heating strip 130 to the seam area during contact is adjusted by any suitable device, such as a conventional adjustable variac 132, to provide sufficient power to raise the temperature of seam area from about 2° C. to 25° C. above the glass transition temperature Tg of the thermoplastic polymer material in at least the charge transport layer of the electrophotographic imaging member belt 10. This thermoplastic polymer material is the top layer of the imaging member, which is for example the charge transport layer comprising a polymer binder with dissolved or molecularly dispersed charge transport compound, of electrophotographic imaging member. Conventional thermostats may be employed to regulate the temperature of the heating strip. The ends of the heating strip 130 may be supported by any suitable means (not shown), such as by hand, spring loaded rollers, clamps, and the like.

A narrow vacuum channel 140 [e.g. having a width of about 0.06 inch (1.5 millimeters)] is used on each side of the support member to vacuum hold the belt 10 down against the flat supporting surface of support member 138. The vacuum channel 140 are about 25 millimeters apart and extend, on each side of seam 30, along the support member 138 to about the full width of the belt 10. The upper ends of the vacuum channels 140 are open and the lower ends are connected by a suitable device such as a valved flexible hose (not shown) leading to any suitable vacuum source. After belt 10 is placed onto support member 138, manually or by any suitable conventional robotic device, the initially closed valve on the flexible hose to the vacuum source is opened to suck belt 10 against the upper flat smooth surface of support member 138 to hold belt 10 immobile on support member 138 during seam smoothing. If desired, a plurality of holes of any suitable shape (e.g. round, oval, square, and the like) may be used instead of or in addition to the channels 140. The number and size of the holes should be sufficient to hold the belt 10 against the support member. The size of the channels and holes should be small enough to avoid distortion of the belt during the seam area heating and compression process. The resistance of the belt to distortion when suction is applied depends on the beam strength of the specific belt employed which in turn depends upon the specific materials in and thickness of the layers in the belt 10. The support member 138 may comprise any suitable hard material. Typical materials include, for example, hard plastic, having a smooth and polished surface. Preferably, support member 138 is metallic. The heating strip 130, preferably has a width of between about 6 millimeters and about 30 millimeters. Heating strip 130 is compressed against seam 30 by the rolling compression wheel to make intimate line contact with the seam. Such intimate line contact of heating strip 130 with seam 30 substantially instantaneously elevates the temperature of only a small localized region of the imaging layer in the seam region of the imaging member belt containing thermoplastic polymer. This small localized region of the imaging layer in the upper portion of the seam region is heated substantially instantly above the Tg of the thermoplastic polymer. Typically, the Tg of a film forming polymer used for an electrophotographic imaging layer, e.g., the charge transport layer, is at least about 45° C. to satisfy most imaging belt machine operating conditions. The expression "Tg of a polymer material" as employed herein is defined as the Tg of the imaging layer of an imaging member. The imaging layer of an imaging member is a charge transport layer if the imaging member is an electrophotographic imaging member and a dielectric layer if the imaging member is an electrographic imaging member. Since the charge transport layer is a composite comprising a polymer binder, a dissolved or molecularly dispersed charge transport organic compound, and optional pigment particles, the Tg in this case is a Tg of the combination. Thus, the expression "polymer material" as employed herein is defined as the polymer and any other material present in an imaging layer. Such polymer material used for electrophotographic imaging layer coating applications normally have a Tg is at least about 45° C. to satisfy most imaging belt machine operating conditions. Preferably, the seam area heating and compression process is carried out between about 2 and about 25° C. above the Tg of the thermoplastic polymer material of the imaging layer (e.g., charge transport layer) in order to achieve sufficient seam smoothing, protrusion spots elimination, and thickness reduction outcomes. Melting, vaporization or cutting through of the seam components during heat treatment should be avoided because this weakens or damages the belt.

The compression wheel in wheel assembly 135 may be hot or cold and may be of any suitable material. Typical materials include, for example, hard plastic, metal, composites, and the like. A metal wheel having a smooth polished surface is preferred. The compression wheel assembly 135 has a circumferential surface that is flat and parallel to the flat surface of the supporting member 138 when the surface profile is viewed in a direction perpendicular to the axis of the wheel. This circumferential surface of the compression wheel preferably provides a uniform linear pressure of between about 1 lb/in (0.18 kilograms/cm) and 20 lbs/in (3.6 kilograms/cm) when rolled against the seam while the belt 10 is held stationary over the flat support surface of the support member 138. The compressive force exerted by the wheel on the strip to generate a perpendicular compression line pressure against the seam may be effected by any suitable device. Typical sources for applying a force on the wheel include, for example, a spring, a weight, and the like. A spring loaded compression wheel assembly is preferred because of its simple constitution or design.

The compression wheel assembly 135 may be moved manually or automatically and substantially continuously or incrementally to roll the wheel over and along heating strip 130 to compress the strip against the seam 30. Any suitable horizontally reciprocateable carriage system 139 may be utilized to effect transverse motion of the wheel of wheel assembly 135 over the heating strip 130 to compress seam 30 across the full width of the belt 10. In other words, the horizontally reciprocateable carriage system 139 transports wheel assembly 135 over and along heating strip 130 to continuously or incrementally apply a line pressure against seam 30 along the entire length of the seam from one edge of the imaging belt 10 to the other. Alternatively, support member 138 with seam 30 and heating strip 130 may be moved substantially continuously or incrementally either manually or automatically while the compression wheel assembly is held immobile. Moreover, if desired, both the support member 138 with seam 30 of belt 10 and heating strip 130 and wheel assembly 135 may be moved simultaneously and relatively with respect to each other to yield the desired seam treatment results, provided sliding motion between the strip and the seam does not occur. Any suitable means such as a horizontally reciprocateable carriage system may be used to move wheel assembly 135. Typical horizontally reciprocateable carriage systems include, for example, ball screw, two way acting air cylinder, lead screw and motor combination, belt or chain drive slide system, and the like. Although the speed of movement of the compression wheel assembly over the heating strip on seamed belt 10 is from about 1 centimeter per second to about 20 centimeters per second to provide satisfactory results, it is preferred that the speed of the wheel be between about 2.5 centimeters per second and 12.5 centimeters per second for optimum results. The process of this invention flattens all protrusions on the welded seam and reduces the thickness in the seam region.

For processing a flexible imaging member belt having a slanted seam, the heating strip and compression wheel may be set to precisely track the slanted seam when traversing the entire belt width. However, it is preferred that the belt itself is cocked and adjusted such that the seam is positioned, without skewing, on the flat support member 138 and under heating strip 130.

Figure 5:
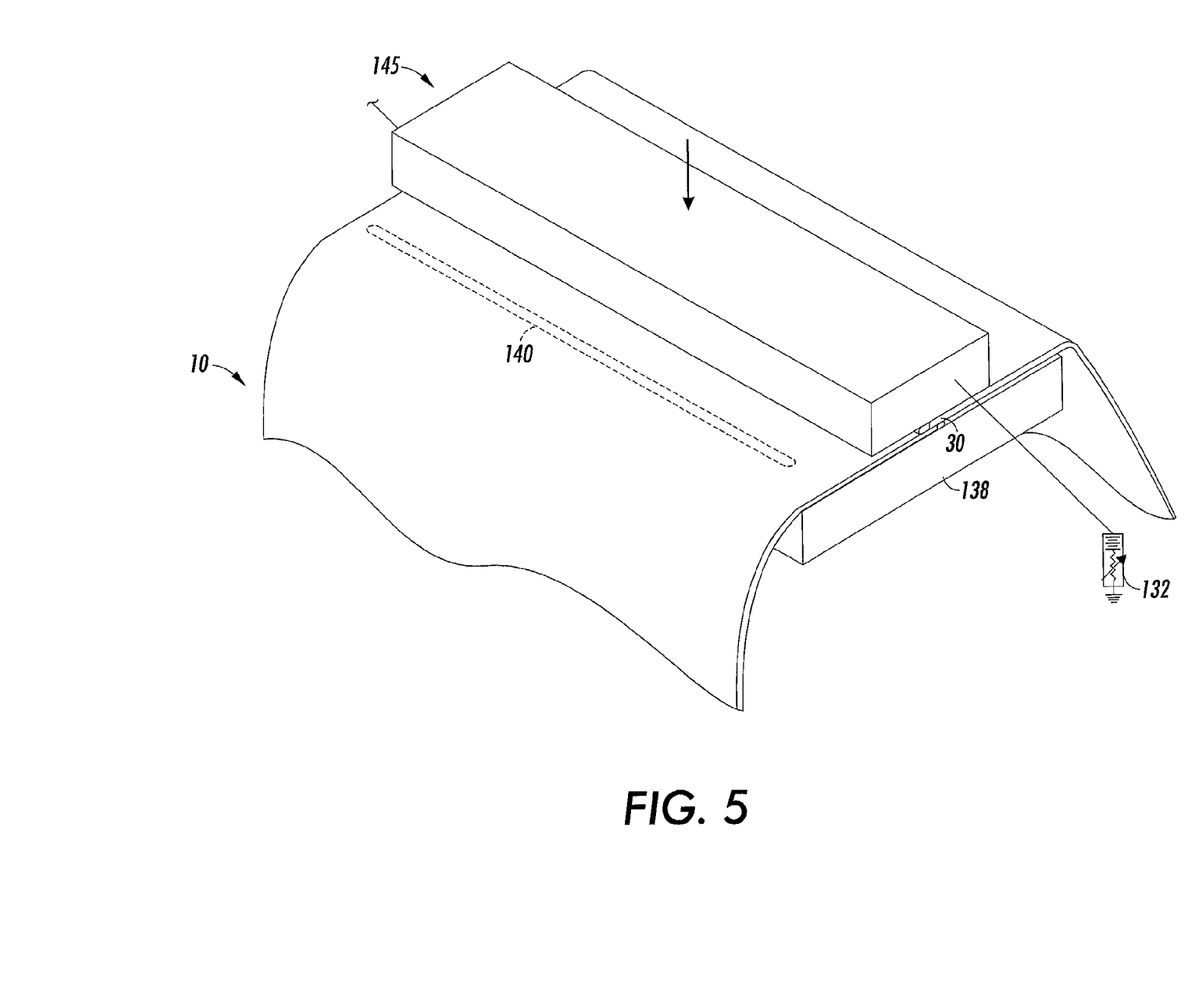
FIG. 5 is a schematic, sectional side view of a seamed flexible electrophotographic imaging member belt in which the seam is positioned onto and held down over the flat supporting surface of an elongated support member while subjected to an elevated temperature seam smoothing and protrusion spots elimination process, utilizing a flat surfaced narrow heating and compression bar.

Illustrated in FIG. 5 is an alternate seam smoothing and protrusion elimination processing system of the present invention, in which a hot compression bar or plate 145 is used to replace the combination of heating strip 130 and compression wheel assembly 135 shown in FIG. 4. The compression bar 145 has a width of between about 6 millimeters and about 25.4 millimeters and a length sufficient to cover seam 30 along the entire width of imaging member belt 10. Compression bar 145 contacts and compresses the seam region of seam 30 while the belt 10 is held down against the flat supporting surface of the support member 30 by the vacuum channels 140. During pressure contact with the seam region, the heat conduction from the hot compression bar 145 heats up the seam region to the desirable temperature and the compression pressure generated by the bar smoothes out the seam, eliminates protrusions, and reduces seam region thickness. The hot compression bar 145 has a smooth contacting surface that is preferably metallic. Compression bar 145 preferably comprises resistance elements (not shown) temperature controlled by any suitable device such as variac 132. Preferably the contacting surface of compression bar 145 has a thin coating of an abhesive or low surface energy material to facilitate release and prevent sticking of imaging layer material to the contacting surface of hot compression bar 145 when it contacts the seam. Any suitable abhesive materials disclosed above with reference to the heating strip may be utilized. An abhesive coating material comprising Teflon is preferred. The compression bar 145 preferably exerts a compressive pressure of between about 10 kilograms per square centimeter and about 100 kilograms per square centimeter on the seam to achieve seam smoothing, protrusion elimination, and seam region thickness reduction.

A temperature range used for heat treating a typical flexible photoreceptor belt, comprising a top exposed charge transport layer containing a thermoplastic polycarbonate polymer and a dissolved or molecularly dispersed charge transport compound, the charge transport layer having a thickness of about 24 micrometers, is between about 185° F. (85° C.) and about 206° F. (97° C.). The charge transport layer has a Tg of about 180° F. (82° C.). Since the preferred imaging member belt seam treatment embodiment of this invention involves heat and pressure contact with only the seam region (a small surface area), the desired treatment temperature is readily reached and cooling of the heat treated seam region to room ambient is attained within a short processing cycle time. Generally, the cycle time of the seam treatment for the typical photoreceptor belt may be accomplished in less than about 20 seconds with the process of this invention for belts having a width of between about 20 centimeters and about 60 centimeters.

Figure 6:
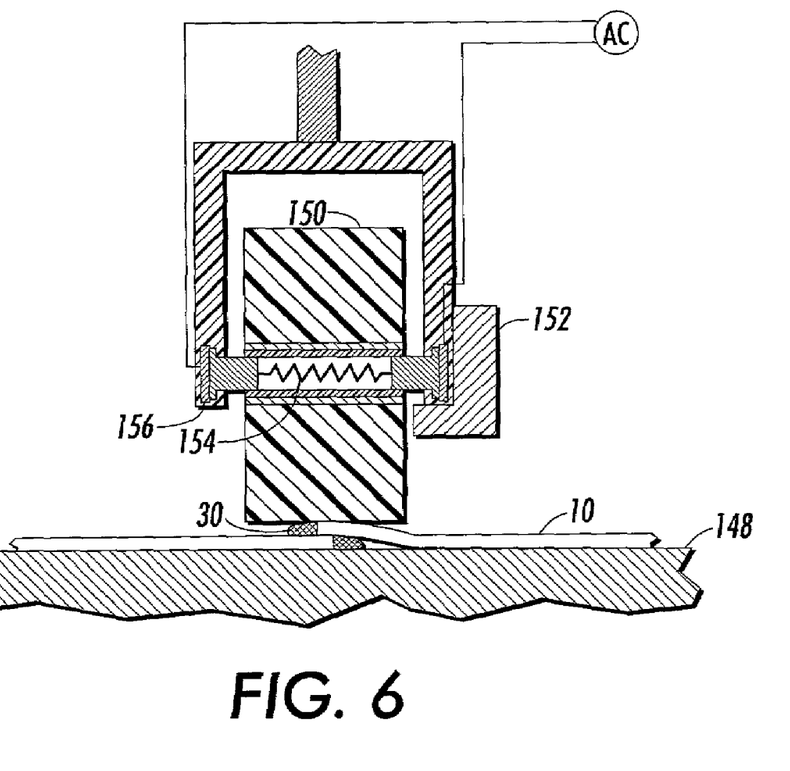
FIG. 6 shows an isometric, schematic view of a seamed flexible electrophotographic imaging member belt in which the seam is parked on and held on a flat surface of an elongated support member while subjected to an alternative seam protrusion elimination process utilizing a hot rolling compression wheel.

Illustrated in FIG. 6 is an alternate protrusion elimination process of the present invention in which a single heated rotatable compression wheel 150 is rolled over the seam 30 of belt 10 parked and held down by vacuum (not shown) onto a smooth flat surface of support member 148. The geometry and design of flat support member 148 is identical to the support member 138 shown in FIG. 5. Compression wheel 150 has a flat outer peripheral surface profile which exerts straight line compression contact against the seam to smooth the exposed surface of seam 30, eliminate protrusions, and reduce the seam region thickness. The direction of the compression force vector is perpendicular to the surface of the support member. The lower edge profile of the peripheral surface of wheel 150 is straight and substantially parallel to the smooth flat surface of the support member 148 during seam treatment. This peripheral surface should be maintained at a temperature sufficient to raise the temperature of the thermoplastic polymer material of the top layer, the imaging layer, of the belt seam to at least its glass transition temperature. The peripheral surface of wheel 150 preferably has a thin coating surface of adhesive material to prevent imaging layer material from adhering to the peripheral surface of wheel 150 during the seam treatment process. Any suitable abhesive material may be utilized. Typical low surface energy or abhesive materials include, for example, Teflon, silicone, fluoro-hydrocarbon polymer, polyimide, and the like. The heated compression wheel 150 is preferably metallic with a smooth peripheral surface. Heating of the wheel may be accomplished by any suitable device such as, for example, by an electromagnetic induction Rf heating mechanism 152 to give the desired temperature when wheel 150 traverses the full width of belt 10 and over seam 30 to compress the seam. Alternatively, any other suitable device, such as a resistance wire heating system 154 may be employed to heat compression wheel 150. Where the resistance wire is part of the wheel, any suitable electrical connection such as slip rings 156 may be used to provide electrical energy to the resistance wires. Sufficient heat energy should be supplied to wheel 150 to adequately heat the peripheral surface thereof. Preferably, the hot rotatable compression wheel 150 is reciprocated and the support member 148 carrying belt 10 remain stationary during the seam treatment. However, if desired, the support tube and belt may be moved and the wheel remains stationary or both may be reciprocated to achieve relative motion with each other. Wheel 150 remains rotatable and exerts a linear compression pressure of between about 1 lb/in (0.18 kilograms/cm) and about 10 lbs/in (1.8 kilograms/cm) onto the seam region during any of the aforesaid seam treatment embodiments. Since the line of compressive contact generated by the rolling wheel contacting the seam at least matches or is greater than the band width (seam region width) of the site on the seam heated by the heated wheel, the continuous rolling action of the compression wheel across the entire belt width, the lines of compressive contact generated is perpendicular to the seam length and of infinite number or continuum which thereby achieves full seam smoothing and stress relaxation of the entire seam region.

When attempts are made to smooth the seam region of an imaging belt at temperatures below the Tg of the polymer material in the upper half of the seam region, such as at room ambient while the seam region is held down over an elongated arcuate convex support member (e.g., by pressing the seam region with a metal surface at high pressures to achieve cold flow of the polymer material), there is a high possibility of causing material failure of the imaging layer at the junction site where the top seam splashing meets the imaging layer because the imaging layer (e.g., charge transport layer having an inherent low break strain of only about 0.03) is brittle and will easily initiate a crack upon subjected to an externally applied compressive force. Thus, for example an imaging belt having a seam region will instantly develop a crack at the charge transport layer/splashing junction site as soon as the seam region is bent and held down to conform to a right angle wrap around the sharp edge of a table top. In sharp contrast, an imaging belt having a seam region pressed against the sharp edge of the same table top, but at an elevated temperature above the Tg of the polymer material (the charge transport layer), will exhibit no seam region cracking problem.

Thus, the process and apparatus of this invention provides a belt in which the seam is free of high protrusions, exhibits decreased in surface roughness, and has a reduced seam area thickness to suppress fatigue induced bending seam stress under dynamic belt flexing conditions over the rollers of a belt support module during imaging machine operation. This reduction of bending stress in the seam region prevents premature on-set of seam cracking and delamination in the welded seam region as the belt is cycled over belt module support rollers. Furthermore, an innovative process, capable of providing imaging member belts with a seam that is free of high protrusions, can substantially enhance imaging member belt production yield to significantly reduce the belt unit manufacturing cost; because successful implementation of this seam treatment process invention eliminates the need of labor intensive and time consuming manual seam inspection procedures and also increases the production belt yield by recovery of those belts that are otherwise lost as rejects due to the presence of seam protrusions. Thus, the post seaming treatment process of this invention provides a seam configuration having improved qualities and physical/mechanical attributes including smoother surface profile, absence of protrusions, and thinner cross-section to enhance cleaning blade performance and suppress the development of fatigue induced seam cracking and delamination problems during electrophotographic imaging and cleaning processes.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An electrophotographic imaging member web was prepared by providing a roll of titanium coated biaxially oriented thermoplastic polyester (Melinex, available from ICI Americas Inc.) substrate having a thickness of 3 mils (76.2 micrometers) and applying thereto, using a gravure applicator, a solution containing 50 parts by weight 3-aminopropyltriethoxysilane, 50.2 parts by weight distilled water, 15 parts by weight acetic, 684.8 parts by weight of 200 proof denatured alcohol, and 200 parts by weight heptane. This layer was then dried to a maximum temperature of 290° F. (143.3° C.) in a forced air oven. The resulting blocking layer had a dry thickness of 0.05 micrometer.

An adhesive interface layer was then prepared by applying to the blocking layer a wet coating containing 5 percent by weight, based on the total weight of the solution, of polyester adhesive (Mor-Ester 49,000, available from Morton International, Inc.) in a 70:30 volume ratio mixture of tetrahydrofuran/cyclohexanone. The adhesive interface layer was dried to a maximum temperature of 275° F. (135° C.) in a forced air oven. The resulting adhesive interface layer had a dry thickness of 0.07 micrometer.

The adhesive interface layer was thereafter coated with a photogenerating layer containing 7.5 percent by volume trigonal selenium, 25 percent by volume N,N'-dipheny-N, N'-bis(3-methylphenyl)-1,1'-biphenyl-4,4'-diamine, and 67.5 percent by volume polyvinylcarbazole. This photogenerating layer was prepared by introducing 160 gms polyvinylcarbazole and 2,800 mls of a 1:1 volume ratio of a mixture of tetrahydrofuran and toluene into a 400 oz. amber bottle. To this solution was added 160 gms of trigonal selenium and 20,000 gms of ⅛ inch (3.2 millimeters) diameter stainless steel shot. This mixture was then placed on a ball mill for 72 to 96 hours. Subsequently, 500 gms of the resulting slurry were added to a solution of 36 gms of polyvinylcarbazole and 20 gms of N,N'-diphenyl-N,N'-bis(3-methylphenyl)-1,1'-biphenyl-4,4'-diamine dissolved in 750 mls of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). However, a strip about 3 mm wide along one edge of the coating web, having the blocking layer and adhesive layer, was deliberately left uncoated by any of the photogenerating layer material to facilitate adequate electrical contact with the ground strip layer that is applied later. This photogenerating layer was dried to a maximum temperature of 280° F. (138° C.) in a forced air oven to form a dry thickness photogenerating layer having a thickness of 2.0 micrometers.

This coated imaging member web was simultaneously overcoated with a charge transport layer and a ground strip layer by co-extrusion of the coating materials. The charge transport layer was prepared by introducing into an amber glass bottle in a weight ratio of 1:1 N,N'-diphenyl-N,N'-bis(3-methylphenyl)-1,1'-biphenyl-4,4'-diamine and Makrolon 5705, a polycarbonate resin having a molecular weight of about 120,000 commercially available from Farbensabricken Bayer A.G. The resulting mixture was dissolved to give 15 percent by weight solid in methylene chloride. This solution was applied on the photogenerator layer by extrusion to form a coating which upon drying gave a thickness of 24 micrometers.

The strip, about 3 mm wide, of the adhesive layer left uncoated by the photogenerator layer, was coated with a ground strip layer during the co-extrusion process. The ground strip layer coating mixture was prepared by combining 23.81 gms. of polycarbonate resin (Makrolon 5705, 7.87 percent by total weight solids, available from Bayer A.G.), and 332 gms of methylene chloride in a carboy container. The container was covered tightly and placed on a roll mill for about 24 hours until the polycarbonate was dissolved in the methylene chloride. The resulting solution was mixed for 15 –30 minutes with about 93,89 gms of graphite dispersion (12.3 percent by weight solids) of 9.41 parts by weight graphite, 2.87 parts by weight ethyl cellulose and 87.7 parts by weight solvent (Acheson Graphite dispersion RW22790, available from Acheson Colloids Company) with the aid of a high shear blade dispersed in a water cooled, jacketed container to prevent the dispersion from overheating and losing solvent. The resulting dispersion was then filtered and the viscosity was adjusted with the aid of methylene chloride. This ground strip layer coating mixture was then applied, by co-extrusion with the charge transport layer, to the electrophotographic imaging member web to form an electrically conductive ground strip layer having a dried thickness of about 14 micrometers.

The resulting imaging member web containing all of the above layers was then passed through a maximum temperature zone of 240° F. (116° C.) in a forced air oven to simultaneously dry both the charge transport layer and the ground strip.

An anti-curl coating was prepared by combining 88.2 gms of polycarbonate resin (Makrolon 5705, available from Goodyear Tire and Rubber Company) and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear dispersion to form the anti-curl coating solution. The anti-curl coating solution was then applied to the rear surface (side opposite the photogenerator layer and charge transport layer) of the electrophotographic imaging member web by extrusion coating and dried to a maximum temperature of 220° F. (104° C.) in a forced air oven to produce a dried coating layer having a thickness of 13.5 micrometers.

EXAMPLE II

The electrophotographic imaging member web of Example I having a width of 353 millimeters, was cut into four separate rectangular sheets of precise 559.5 millimeters in length. The opposite ends of each imaging member were overlapped 1 mm and joined by ultrasonic energy seam welding process using a 40 Khz horn frequency to form four seamed electrophotographic imaging member belts. Three of these seamed belts are to be subjected to a protrusion elimination process while the remaining untreated belt is used to serve as a control.

EXAMPLE III

To effect seam treatment processing, each of the three welded electrophotographic imaging member belts described in Example II may be suspended and held down, with the seam in the middle, against a horizontally positioned elongated smooth flat surface support member by a pair of vacuum slot, each slot extending transversely across the width of the imaging member belt. Each slot may be 2 millimeters wide. The slots are connected to a vacuum source to provide and maintain a vacuum pressure of about 40 mm Hg. The belt in the seam region can be held down against the flat upper surface of the support member so when the valve to the vacuum source is opened the seam area conforms to the flat surface of the support member. A narrow, heated heating and compression bar having a contacting flat surface of about 12 millimeters in width and a length sufficient to match the full imaging member belt width can be used to press against the seam region to provide a 50 kilograms per square centimeter compression pressure and raise the seam region temperature raise to about 90° C., 8° C. above the glass transition temperature Tg of the charge transport layer. The heating and compression bar can have a smooth Kapton (a polyimide) layer to prevent imaging layer material from sticking to the surface and provided ease of bar release from the seam region after completion of treatment process. This seam treatment processing can be carried out according to the schematic arrangement illustrated in FIG. 5 and the seam treatment processing cycle for each of the imaging member belts is expected to be accomplished in about 19 seconds to effect seam morphological surface smoothing, protrusion elimination, and thickness reduction. Thus, it is expected that each imaging member belt can be completed in about a nineteen second treatment cycle.

The resulting 12 millimeters wide treated seam area across the width of the belt is not expected to exhibit a seam area set or any notable circumferential belt dimensional shrinkage. Furthermore, comparison of the results of seam morphological measurements obtained before and after invention seam treatment processing should show that the top seam splash height, overlap to splash elevation, and splash surface roughness are effectively reduced.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. Apparatus for the post treatment of an ultrasonically welded seamed flexible imaging member belt to produce a smooth seam region comprising:
   a lower support member having a smooth upper flat surface adapted to receive and support a seam region of a welded seamed flexible imaging member belt comprising thermoplastic polymer material having a predetermined glass transition temperature;
   an upper heatable strip having a smooth lower heatable flat surface, the lower heatable flat surface of the heatable strip having a profile which is parallel to the smooth flat surface of the support member, the lower heatable flat surface comprising a low surface energy or abhesive material, the strip aligned for centering over the seam region, and wherein the strip has a width of between about 6 mm and about 30 mm; and
   a rotatable compression wheel located so as to contact the upper heatable strip to compress the strip against the seam region;
   wherein the lower support member and the upper heatable strip are located so as to directly contact the flexible imaging member belt; and
   wherein the rotatable compression wheel moves transversely across the seam region.

2. Apparatus according to claim 1 wherein the strip is a metal or a plastic.

3. Apparatus according to claim 1 wherein the strip is an electrically resistive material or a composite device.

4. Apparatus according to claim 3 wherein the strip comprises a supporting member containing imbedded resistance wires spaced to ensure uniform heating along the length of the strip.

5. Apparatus according to claim 1 wherein the strip raises the temperature of the seam area from about 2° C. to 25° C. above the glass transition temperature (Tg), but below the melting temperature, of the thermoplastic polymer material in at least the charge transport layer of the imaging member belt.

6. Apparatus according to claim 1 wherein the rotatable compression wheel comprises a hard plastic, metal, or composite material.

7. Apparatus according to claim 1 wherein the rotatable compression wheel is a metal wheel with a smooth polished surface.

8. Apparatus according to claim 1 wherein a rotatable compression wheel may be moved manually or automatically.

9. Apparatus according to claim 1 wherein the low surface energy or abhesive material comprises Teflon, fluoro-hydrocarbon polymer, silicone, polyimide, and the like.

* * * * *